United States Patent [19]

Jackel et al.

[11] Patent Number: 5,434,942
[45] Date of Patent: Jul. 18, 1995

[54] LOW THRESHOLD BRILLOUIN ACTIVE DEVICES

[75] Inventors: Steven Jackel, Rehovot; Pinchas Shalev; Aharon Bornstein, both of Rishon LeZion; Raphael Lallouz, Ashdod, all of Israel

[73] Assignee: The State of Israel, Atomic Energy Commission, Soreq Nuclear Research Center, Yavne, Israel

[21] Appl. No.: 158,112

[22] Filed: Nov. 24, 1993

[51] Int. Cl.⁶ .............................................. G02B 6/16
[52] U.S. Cl. ........................................ 385/122; 385/33; 385/43; 385/115; 372/6; 372/21; 356/350
[58] Field of Search ............... 385/31, 33, 36, 122, 385/123, 115, 43, 121; 372/9, 6, 94, 99, 21; 356/350

[56] References Cited

U.S. PATENT DOCUMENTS

| | | | |
|---|---|---|---|
| 4,654,532 | 3/1987 | Hirschfeld | 250/458.1 |
| 4,812,682 | 3/1989 | Holmes | 359/327 |
| 4,898,450 | 2/1990 | Jannson et al. | 385/33 |
| 5,038,359 | 8/1991 | Pepper et al. | 372/99 |
| 5,064,288 | 11/1991 | Dyes et al. | 356/350 |
| 5,170,457 | 12/1992 | Jen | 385/123 |
| 5,208,881 | 5/1993 | Bruesselbach | 385/27 |

OTHER PUBLICATIONS

"Nonlinear Effects in Image Formation", Hendrik J. Gerritsen, May, 1967 Applied Physics Letters, vol. 10, No. 9, pp. 239–241.
"Stimulated Brillouin Scattering in Liquids", E. Garmire and C. H. Townes, Aug. 1964, Applied Physics Letters, vol. 5, No. 4, pp. 84–86.
"Formation of a Transient Free Carrier Hologram in Si", J. P. Woerdman, Oct. 1970, Optics Communications, vol. 2, No. 5, Oct., 1970, pp. 212–214.
"Coupled Wave Analysis of Holographic Storage in LiNbO3", D. E. Stabler and J. J. Amodei, Mar. 1972, Appl. Physics, vol. 43, No. 3, pp. 1042–1049.
"Recording Two-Dimensional and Three-Dimensional Dynamic Holograms in Transient Substances", B. I. Stepanov, E. V. Ivakin, and A. S. Rubanov, Jul. 1971, Soviet Physics, vol. 16, No. 1, pp. 46–48.
"Laser Applications to Optics and Spectroscopy", S. Jacobs, et al., 1975 (no month available), Addison-Wesley Publishing Co., pp. 213–245.

Primary Examiner—Frank Gonzalez
Attorney, Agent, or Firm—Helfgott & Karas

[57] ABSTRACT

A non-linear optics device (NLOD) of the kind in which an incoming pumping beam having an intensity below a certain threshold is transmitted through the device, whereas a beam having an intensity above the threshold induces a Stimulated Brillouin Scatter (SBS) process giving rise to the reflection back of the beam in an opposite direction. The device includes one or more optical fibers having each a cladding and a core consisting of a non-linear substance which, as a rule, is composed of two longitudinal sections integral with one another, one having a uniform diameter and the other being tapered. The core surface is diverged towards one end of the fiber. Each optical fiber is so oriented that the end of the tapering section faces the incoming pumping beam. Accordingly, when an oncoming pumping beam is incident on the surface of the tapering core portion at an angle below a certain critical angle, it is transmitted to the uniform core section.

11 Claims, 4 Drawing Sheets

LOW THRESHOLD BRILLOUIN ACTIVE DEVICES

FIELD OF THE INVENTION

The present invention is in the field of non-linear optics and concerns devices utilizing the Stimulated Brillouin Scatter (SBS) process. Known SBS based devices include phase conjugate mirrors (PCM), non-linear isolators (NLI) and Brillouin amplifiers (BA). Such devices will be referred to herein generally as "non-linear optical devices" (NLOD).

The SBS process, generally known in the art, is utilized in PCM's for correcting distortions in light beams originating from various linear devices within optical circuits, such as optical amplifiers or from the propagation media. Due to this corrective capability, and with the object of obtaining high quality beams, NLODs have a large number of applications in which they are designed to compensate static and dynamic distortions occurring in optical systems. In BAs the SBS process is used to amplify weak one and two dimensional optical signals.

The NLOD devices of the present invention can be used in all such applications which also form an aspect of the present invention, particularly non limiting applications as PCMs and BAs.

BACKGROUND OF THE INVENTION

It is often required to amplify a low power laser beam for various applications. However, the laser amplification process usually distorts the input beam to yield a degragaded amplified output beam. Such a beam very often becomes useless for many types of applications. Thus, in order to obtain a high quality beam, it is necessary to compensate for the aforementioned distortions.

It was found (Garmire and Townes, 1964, Appl. Phys. Lett. 5, 84) that when a certain medium such as liquid carbon disulfide ($CS_2$,) is irradiated by an input pumping beam having an intensity exceeding a certain threshold value, the beam interacts with the molecules of the medium in a so called Stimulated Brillouin Scattering (SBS) effect, and an output beam emerges from the medium in a direction opposite to that of the pumping beam. This threshold value will be referred to herein as the "critical beam intensity". Thus, if the pumping beam intensity is above the critical beam intensity the medium acts as a type of mirror, while if the pumping beam's intensity is below the critical beam intensity it passes the medium with no substantial attenuation. A medium having such properties will be referred to herein as "non-linear medium" or "non-linear substance".

It was further found (Woerdman, 1970, Opt. Comm., 2,212; Stabler & Amodei, 1972, J. Appl. Phys. 43, 1042; Stepanov et al., 1971, Sov. Phys.—Doklady 16, 46) that due to the SBS process, if an input pumping beam that incidents upon the non-linear medium carries distortions, then the characteristics of the output beam are such that it carries the same distortions of the input beam but with the opposite retative phase difference. Thus, when the output beam passes a second time through the same components which introduced the distortions (i.e. an amplifier) it emerges therefrom free of the distortions, yielding an amplified beam of high quality. The device which implements this process is known in the literature as a "phase conjugation mirror" (PCM).

If the PCM is replaced by a standard mirror, the distortions in the reflected output beam are increased, as the reflected beam containing the first pass distortions passes the distorting component a second time and picks up a second amount of phase distortions. This then gives rise to an output beam of an even poorer quality.

When using a so-called "tight focus" geometry with a focusing lens in front of the cell filled with the non-linear substance, the critical beam energy, i.e. the SBS energy threshold, $E_{threshold}$, of a Gaussian laser beam, which is assumed to have a high light coupling coefficient of about 1.0, obeys the following formula (1):

$$E_{threshold} = 30 \cdot \frac{\lambda_o \cdot T_{laser}}{G} \quad (1)$$

where G is the Brillouin gain coefficient which is derived from the properties of the non-linear medium, $\lambda_o$ is the wavelength of the pumping beam in vacuum, and $T_{laser}$ is the laser pulse duration.

A tight focus NLOD is suitable for various applications but it has the drawback of relatively high $E_{threshold}$. Thus, if the input beam does not reach this critical beam intensity value, the pumping beam cannot be phase conjugated which in fact limits the use of such devices in various applications.

In order to overcome the intrinsic shortcomings of the high threshold required to stimulate the SBS in a tight focus medium, another type of NLOD was proposed (E. Ippen, 1975, "Nonlinear effects in optical fibers", in Laser Applications to Optics and Spectroscopy, Ed: S. Jacobs et al., 213-244, Addison-Wesley Pub. Co., Reading, Mass., U.S.A.), in which the tight focus medium is replaced by an optical fiber, the core of which is filled with a suitable non-linear substance. In such a fiber optics based NLOD, the power required to stimulate in the SBS process obeys the formula (2):

$$E_{threshold} = 30 \cdot \frac{T_{laser} \cdot A_{interaction}}{G \cdot L_{interaction} \cdot \eta} \quad (2)$$

where $T_{laser}$ is the laser pulse's duration, $A_{interaction}$ is the cross-sectional area of the core of the optical fiber, $L_{interaction}$ is the length of the interaction region, i.e. the length of the optical fiber, G is the Brillouin gain coefficient which is derived from the substance's properties, and $\eta$ is the light coupling coefficient into the straight fiber section.

In such a device $E_{threshold}$ can be decreased by reducing the diameter of the optical fiber and/or increasing its length. Thus, by using an optical fiber-based PCM the SBS process can be stimulated even for low power input pumping beams.

Theoretically, the simple optical fiber-based PCM has a significant advantage over the tight-focus PCM. It does, however, have a significant shortcoming that renders the device impractical, in that it proves very difficult to focus the input pumping beam to a small diameter optical fiber (which is typically in the range of 10–30 $\mu$m). Various solutions, such as using a complicated lens system to concentrate the input pumping beam, turn out to be both cumbersome and inefficient in overcoming the above shortcomings.

The use of tapered optical fibers for coupling free space propagating light into small diameter optical fibers has been described (Hirschfeld, 1987, U.S. Pat. No. 4,654,532; Jannson et al., 1990, U.S. Pat. No. 4,898,450). However, the utilization of such optical fibers in non-linear optical devices based on stimulated scattering has not yet been described.

It is the object of the present invention to provide an optical fiber-based NLOD which overcomes the focusing shortcomings of prior art NLODs of this kind.

SUMMARY OF THE INVENTION

All attempts hitherto of improving the performance of an optical fiber based NLOD, concentrated on the manipulation of the incoming pumping beam by various intricate targeting mechanisms to direct it into the very narrow opening of the constant cross-section optical fiber in such a device. Against this, the present invention is based on the novel realization that rather than manipulating a beam, the performance of such device can be considerably improved by improving the capability of an NLOD to collect light rays.

The object of the present invention is realized in accordance with one of its embodiments by the use of an optical fiber having a cladding and a core, consisting of a non-linear optical medium. One end portion of the core forms part of an outwardly tapering section, i.e. a section that resembles a funnel, and this end portion is adapted to receive incoming light beams, thus acting as a light collection element whereby the efficiency of such an optical fiber-based NLOD is considerably increased and the alignment sensitivity of the incoming light beams is considerably reduced. This embodiment will be referred to herein at times as the "single tapered optical fiber embodiment".

For every optical fiber of the kind specified there exists a critical transmission angle defined herein as being the angle of light incidence on the said tapering section below which the incident light will be transmitted by the fiber. The critical transmission angle depends on the nature and geometry of the core and cladding and the characteristics of the incident light as will be specifically explained hereinafter.

The present invention thus provides, in accordance with the single tapered optical fiber embodiment, a non-linear optics device (NLOD) of the kind in which an incoming pumping beam of an intensity below the critical beam intensity is transmitted through the device and a beam having an intensity above the critical beam intensity, induces a Stimulated Brillouin Scatter (SBS) process whereby the beam is reflected back in an opposite direction, said device comprising one or more optical fibers having each a cladding and a core consisting of a non-linear optical substance and having a uniform section and a tapered section integrally linked to each other at a merger zone, the uniform core section having a first core diameter, being the same throughout its entire length and the tapered core section having a core with diverging walls such that the first end thereof, extending from the merger zone, is of a diameter essentially equal to that of the first core diameter and the second end is of a substantially larger diameter; the optical fiber being orientated so that the tapered section faces the incoming pumping beam; whereby a pumping beam incident on the tapered sections' inner walls at an angle below the critical transmission angle of the optical fiber is directed into the uniform core section thereof.

The inside walls of the taper's core may be essentially straight, inclined or may be convexed (i.e. having an outward directed curvature), etc.

In accordance with another embodiment of the present invention, the above object is achieved by the use of an array of optical fibers. Additionally, in accordance with this embodiment, the optical fibers in the array may be tapered as above. The straight fiber array embodiment will be referred to herein as the "array embodiment", and the additional array embodiment where the optical fibers are tapered will be referred to herein as the "tapered array embodiment".

In accordance with the array embodiment, there is thus provided an NLOD of the kind in which an incoming pumping beam of an intensity below a critical beam intensity is transmitted through the device and a beam having an intensity above the critical beam intensity, induces a Stimulated Brillouin Scatter (SBS) process whereby the beam is reflected back in an opposite direction, said device comprising an array of optical fibers having each a cladding and a core consisting of a non-linear optical substance, with the fibers being oriented towards the incoming pumping beam.

The device of the present invention is thus capable of collecting light rays from a much wider area than in NLODs hitherto known. Thus, the device of the present invention achieves the following very important results:

(i) The accuracy of positioning of a beam (or conversely of positioning of the NLOD) can be reduced and thus very elaborate and expensive optical and mechanical means which were otherwise required for positioning can be down-graded or eliminated altogether;

(ii) In optical fiber-based NLODs hitherto known, in order to induce the SBS process, it was necessary to have a pumping beam of a relatively high intensity in order to ensure that the portion of the light that would enter the optical fiber would have sufficient energy to be above $E_{threshold}$. In the NLOD of the present invention, the general intensity of the light beam can be lower, as a much larger proportion thereof will enter the uniform section of the optical fiber and be available for induction of the SBS process.

In the single tapered optical fiber embodiment, in order to ensure that a light ray incidenting on the tapered section will enter into the uniform section, the angle relative to the internal surface of the taper at the point of incidence should not exceed a certain maximal angle, which will be referred to herein "$\theta_{o\,max}$". $\theta_{o\,max}$, as will be explained in more details below, depends on various parameters including the relative refraction indices of the cladding and the core and the taper's angle of inclination.

In accordance with one modification of the "single tapered fiber optics embodiment", to be referred to herein as the "simple-single fiber embodiment", the device comprises a single tapered optical fiber as defined above, essentially co-directional with the direction of the incoming pumping beam. The pumping beam is as a rule emitted by a laser source. However, due to intrinsic properties of light, a laser beam of finite diameter, has some divergence, and furthermore, the axis of the laser beam may vary to some extent with the result that only portion of the beam will be collected by the tapering end, with the risk that the energy of the so collected beam portion will not suffice to induce the SBS process. In order to improve convergence, in accordance with another modification of the tapered fiber embodiment, to be referred to herein as the "lens-single fiber embodiment", the device comprises a lens placed in front of the tapering end at a given distance therefrom, intended to converge the light beam into the tapered optical fiber. While in the simple-single fiber embodiment, the entire task of converging the light is performed by the tapered section, in the case of the lens-single fiber embodiment this is performed jointly by the tapered sections and by the lens.

It should be pointed out that it is possible to combine a lens also to a device in accordance with the array embodiments.

The NLOD of the present invention may have a variety of uses in various non-linear optic system utilizing the Stimulated Brillouin Scatter. One example of use of the device is as a PCM in which the device acts as a correction mirror by reflecting the light back in a counter direction of a pumping beam introducing aberrations of an opposite phase, whereby the light beam travelling through the system's components, with the introduced "negative aberrations", receives the "positive aberrations" from these components and consequently the light emerging eventually is essentially free of any distortions.

A second example of use of an NLOD of the invention is as a BA. In a BA, a low intensity signal beam is combined with a high intensity pumping beam, and as a result, energy is transferred from the pumping beam into the signal beam whereby the output beam is a high intensity signal beam bringing about an amplification of the original signal.

In an optical fiber-based BA, the pump beam is entered through one end of the optical fiber and the signal beam through another. Thus, in a BA of the invention preferably both ends of the optical fiber are tapered. In the array embodiment, the signal beam information can be amplified with a spatial resolution, whereas in accordance with the single tapered fiber embodiment all spatial information is lost unless the amplified signal beam is reflected from a PCM.

The present invention thus encompasses in its scope also various optical systems incorporating an NLOD of the present invention.

BRIEF DESCRIPTION OF THE DRAWINGS

For a better understanding, the invention will now be described by way of example only, with reference to the accompanying drawings in which.

DETAILED DESCRIPTION OF THE INVENTION

The present invention will now be illustrated and described in somewhat more details with reference to some embodiments depicted in the annexed drawings.

Figure 1:
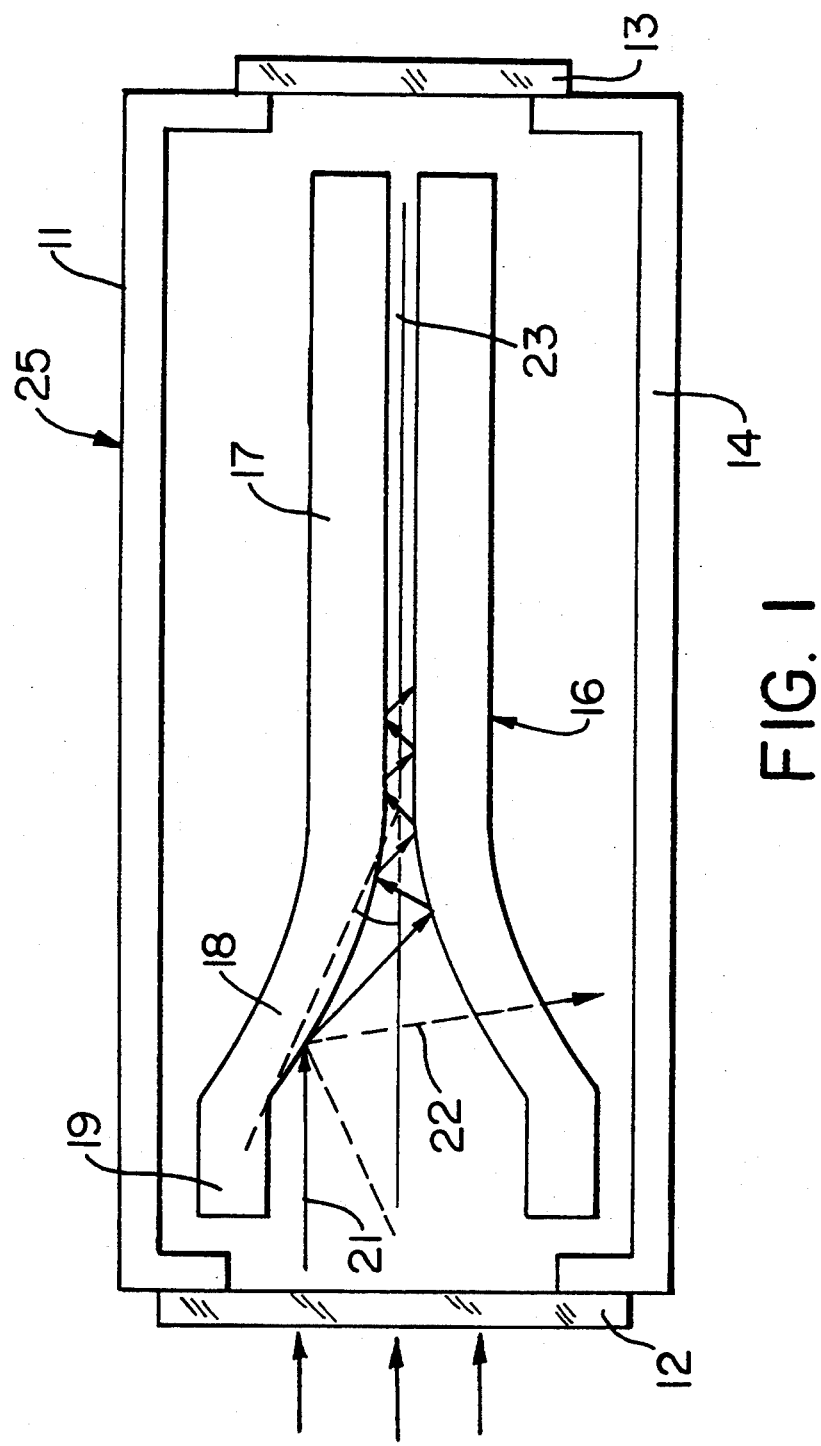
FIG. 1 is a schematic side view of a device in accordance with the simple single fiber embodiment of the present invention.

Attention is first being made to FIG. 1 showing an NLOD 10 in accordance with the simple single fiber embodiment of the invention, comprising a cell 11 having a front transparent window 12 and a rear transparent window 13. The space 14 inside cell 11 is filled with a non-linear optics fluid, which may be a liquid such as $CS_2$, or various other kinds of known non-linear liquids known per se. It is also possible to use non-linear gases in which case it will usually be required to coat the fiber's interior with a reflective coating.

Device 10 further comprises an optical fiber inside cell 11, generally designated 16, which comprises a rear, uniform section 17 and a front, tapered section 18. The optical fiber has a hollow core 20 filled by the non-linear optics fluid present in space 14, which core is of a uniform diameter in the uniform section 17 of the optical fiber and has diverging side walls in the tapered section 18. Extending from the tapered section 18 is a small cylindrical section 19 which has the same diameter as that of the front end of the tapered section. Optical fiber 16 may typically have a circular cross-section but other cross-sections are also possible such as oval or polygonal.

The uniform section 17 will have a length and diameter depending on the desired $E_{threshold}$, in accordance with formula (2) above. It should be noted that the diameter is constrained by an additional physical requirement noted below (see "$d_s$" in formula (10)).

As can be seen in FIG. 1, a light ray, represented by arrow 21, which is incident on the tapered section 18 at an angle lower than $\theta_{max}$ (see below) will be reflected between opposite surfaces of the tapering section so that eventually it enters into the core of the uniform section 17. When the total energy entering into the core of the uniform section exceeds $E_{threshold}$, the SBS process will be initiated and as a result a light beam having a counter direction to that of the pumping beam (in the opposite direction to arrow 21), will emerge. When the total energy is below $E_{threshold}$, the beam will be transmitted undiminished through the optical fiber and will exit through window 13.

The relation between the approximate taper angle $\gamma$ (see FIG. 1; although the tapering section is slightly convex, its longitudinal shape can be approximated to a straight line), the angle between the taper axis and a light ray $\theta_o$, and the angle of a light beam after hitting the taper's internal wall n times, $\theta_n$ is represented by the following formula (3).

$$\theta_n = \theta_0 + 2n\gamma \qquad (3)$$

In order to get a total internal reflection of a light beam within the taper, i.e. to avoid the escape of a light beam, such as beam 23 in FIG. 1, the conditions defined in the following formula (4) should be met:

$$\gamma = \frac{\theta_n - \theta_0}{2n} < \sin^{-1}\left(\frac{n_2}{n_1}\right) \qquad (4)$$

$\theta_{o\ max}$ is the maximum angle $\theta_o$ for directing a light ray into the straight section, i.e. a light ray having an angle above $\theta_{o\ max}$ will escape from the optical fiber (see for example dotted line 23 in FIG. 1). $\theta_{o\ max}$ may be determined by an approximation shown in the following formula (5), which follows a geometric analysis based on a theorem of brightness conservation (Jannson and Winston, 1986, *J. Opt. Soc. Am.* A3, 7-8), Snell's Law, The Definition of the Critical Angle, the fact that the taper angle $\gamma$ is usually small, and the assumption that input angles will be sufficiently small for the approximation $\theta_o \approx \sin \theta_o$:

$$\theta_{omax} \approx n_1 \frac{d_s}{d_t} \left[ 2 \left[ 1 - \sin \left[ \gamma + \sin^{-1} \left( \frac{n_2}{n_1} \right) \right] \right] \right]^{\frac{1}{2}} \approx \tag{5}$$

$$n_1 \frac{d_s}{d_t} \left[ 2 \left( 1 - \frac{n_2}{n_1} \right) \right]^{\frac{1}{2}}$$

As can be seen, $\theta_{o\,max}$ is dependent on the taper input diameter (the diameter of the front end of the taper, $d_t$), the diameter of the uniform section ($d_s$) and the core and cladding indices of refraction ($n_1$ and $n_2$).

For example, for a tapered Pyrex waveguide ($n_2 = 1.48$) with a uniform section diameter of 10 μm and filled with $CS_2$ ($n_1 = 1.63$), formula (5) is reduced to $$\theta_{omax} \approx \frac{(7.0 \times 10^{-4} \text{ cm})}{d_t} \tag{6}$$

A laser beam has a characteristic beam divergence ($\theta_B$) which must be less than or equal to $\theta_{o\,max}$ if all of the light of the laser beam is to be injected into the uniform section of the optical fiber. Obviously, a further requirement is that $d_t$ will be equal or larger than the beam's diameter at the entry of the beam to the tapered section. These requirements are not absolute since if $E_{threshold}$ is less than the beam's total energy, then it is possible to induce the SBS process also if only a portion of the beam enters the uniform section of the optical fiber.

Figure 2:
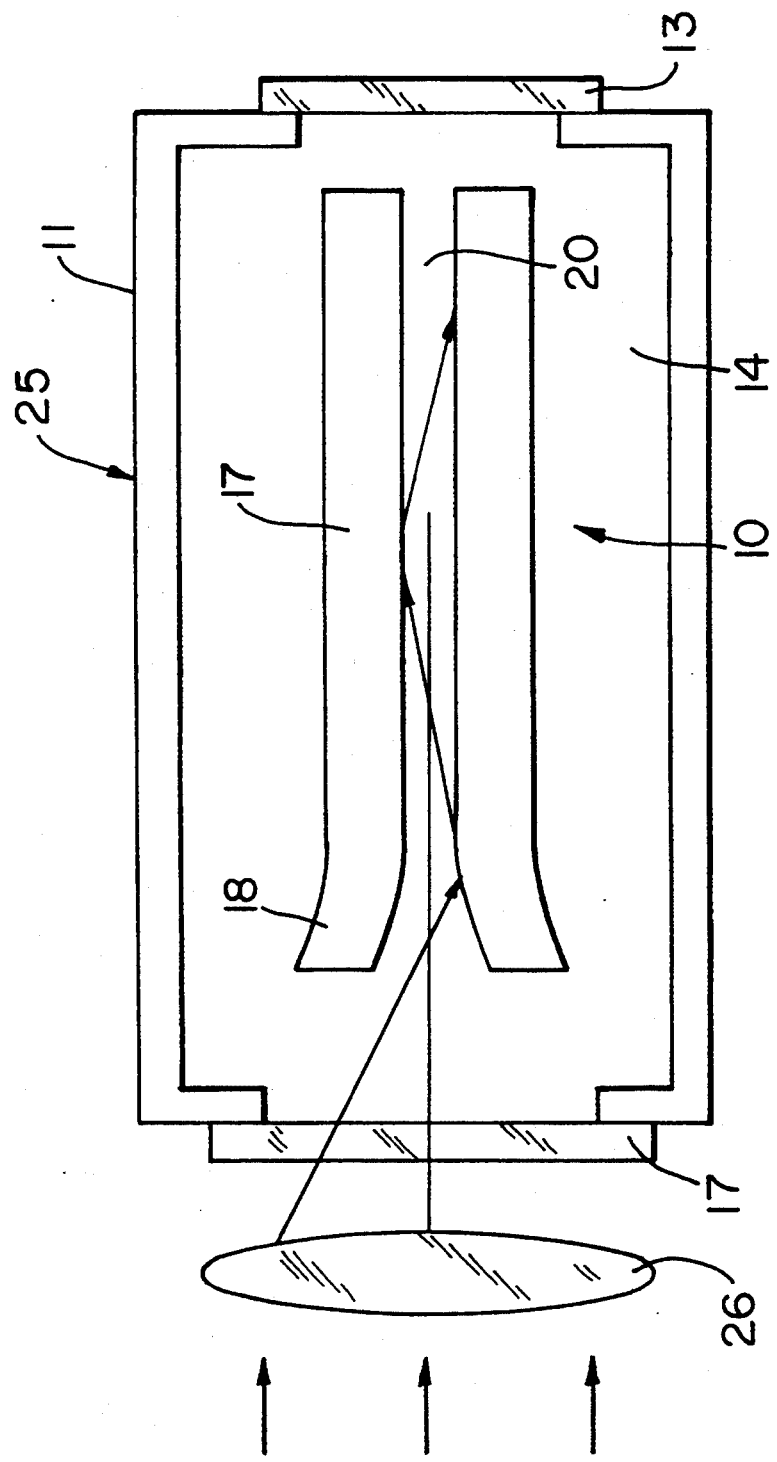
FIG. 2 is a schematic side view of a device in accordance with the lens single fiber embodiment of the present invention.

Attention is now made to FIG. 2 showing an NLOD 25 in accordance with the lens' embodiment of the invention. The operation of the device in accordance with this embodiment is in principle very similar to that in accordance with the simple embodiment, the difference being in that the light is concentrated by means of lens 26. In FIG. 2 all like components to the embodiment of FIG. 1 are marked by like reference numerals. The light coming out of lens 26 has to obey the same rules as the laser beam in the embodiment of FIG. 1.

Figure 3:
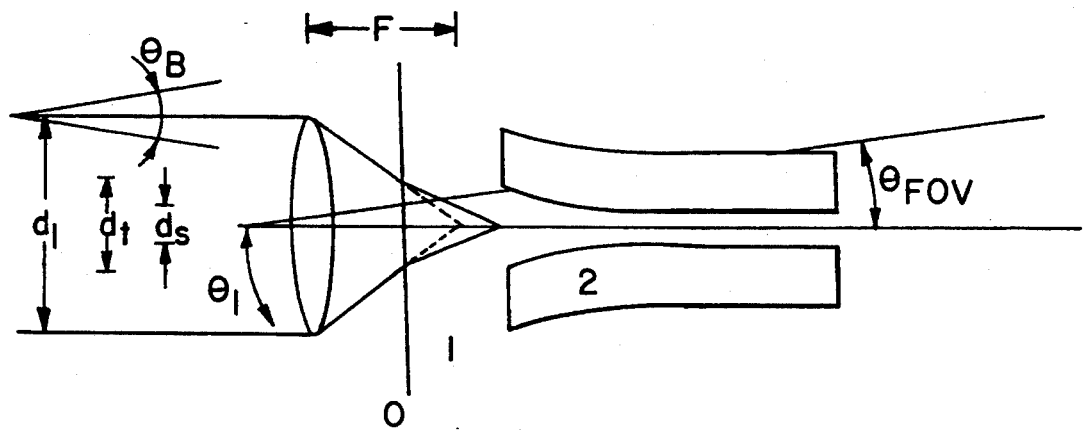
FIG. 3 shows the embodiment of FIG. 2 with various physical parameters entered there to aid in the explanation of the theory of operation of the device as will be detailed in the following text.

In order to explain the embodiment of FIG. 2, attention is now being made to FIG. 3. The light rays emerging from the lens pass through a first medium, typically air, having a refraction index, $n_o$, close to 1.0 and then through the non-linear optic medium having a refraction index $n_1$ and bouncing onto a cladding of an optical fiber having a refraction index $n_2$. In this embodiment, the two angles of importance are the cone angle of the focusing lens $\theta_L$ and the fiber's angular field of view $\theta_{FOV}$. These are given by the following formulae (7) and (8):

$$\theta_L = \frac{d_L}{2F} = \frac{1}{2f} \tag{7}$$

$$\theta_{FOV} = \frac{d_t}{2F} \tag{8}$$

where $d_L$ is the lens' diameter, F the lens' focal length as if the air/fluid interface occurs next to the lens. The larger of these two angles will, as may be appreciated, constrain the taper's design. Typically, $\theta_L$ will be larger than $\theta_{FOV}$ and in such a case, solving the formulae (2) and (8) for $d_t$ and then for $\theta_{FOV}$, the following formulae (9) and (10) are obtained.

$$d_t = 2fn_1 d_s \left[ 2 \left( 1 - \frac{n_2}{n_1} \right) \right]^{\frac{1}{2}} \tag{9}$$

$$\theta_{FOV} = n_1 \frac{d_s}{d_L} \left[ 2 \left( 1 - \frac{n_2}{n_1} \right) \right]^{\frac{1}{2}} \tag{10}$$

$\theta_{FOV}$ is usually determined to be of equal magnitude to that of $\theta_B$ which is the divergence of the laser beam. $d_L$ is ususally taken to be of equal magnitude to the diameter of the laser beam at the lens. The laser beam may have a parallel shift, which may increase the effective beam width $d_L$ accordingly. Thus, by fixing $\theta_{FOV}$, $d_L$ and by knowing the refraction index $n_1$ and $n_2$, $d_s$ can be obtained from formula (10). The length of the optical fiber needed to initiate the SBS process, can then be determined from formula (2) above according to the desired $E_{threshold}$.

Upon knowing $d_s$, and applying formula (9), a range of matching $d_t$ and f-numbers can be obtained (f-number: "f" in formulae (7) and (9)), and either the f-number of the lens will be matched to a known taper, or the taper diameter will be designed to match a lens having a certain f-number.

Relating back to the above numerical example and taking a typical focusing lens ($f = 2.5$, $d_L = 1$ cm), thus yields a $d_t$ of $5.7 \times 10^{-3}$ cm and $\theta_{FOV}$ of $7.0 \times 10^{-4}$ rad. The field of view enhancement obtained by the use of the tapered optical fiber over use of a non-tapered fiber, can be calculated to be, in accordance with the above numerical example, an enhancement of 5.7. For larger f-number lenses, the advantages of using a taper to reduce absolute translational sensitivity increases even further.

All the above calculations, as already pointed out, take into consideration that the taper angle $\gamma$ in formula (3) above is small. Where $\gamma$ is relatively large, the calculations required to determine the various parameters of the systems are somewhat more complex, but no doubt attainable by the artisan.

Figure 4:
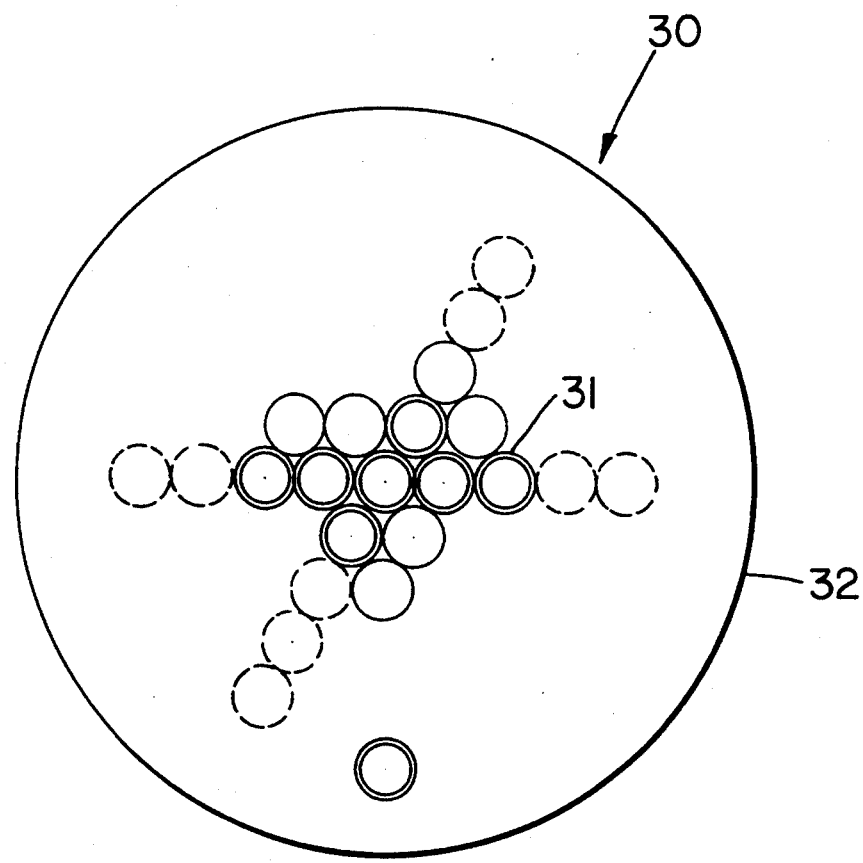
FIG. 4 is a schematic front view of a device in accordance with the array embodiment of the present invention.
Figure 5:
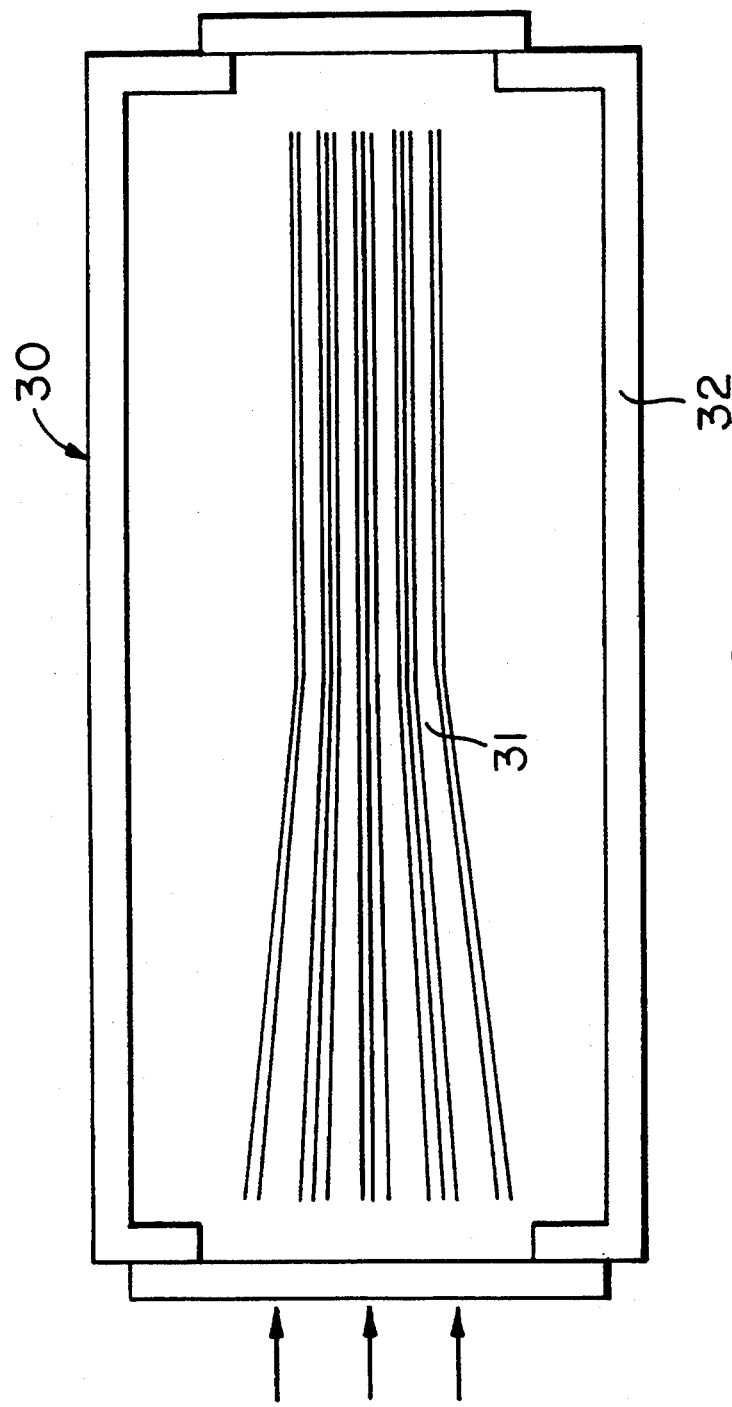
FIG. 5 is a schematic side view of a device in accordance with the tapered array embodiment.

Attention is now being directed to FIGS. 4 and 5, the first being a schematical front view of an NLOD in accordance with the array embodiment of the present invention and the latter being a schematic side view of a device in accordance with the tapered array embodiment. The device 30 in accordance with this embodiment comprises a plurality of hollow optical fibers 31 is closed within a cell 32, filled with a non-linear optical medium in the same manner as in the other embodiments. The hollow optical fibers should have a relatively thin cladding so as to minimize insertion losses. The fibers may have circular or polygonal cross-sections.

A hollow fiber array (HFA) for use in the array embodiment of the invention, can be prepared by first tightly packing a cylindrical glass envelope with thin wall capillary tubes, then heating this preformed structure to its softening point, and then stretching it to form the HFA. HFAs may have constant diameter fibers or they may contain a tapered section as in the embodiment of FIG. 5.

The big advantage of an HFA is that its angular field of view is large. For constant diameter fibers, the maximum input angle to the HFA ($\theta_{o\ max}$) is large and is given by the following formula (9)

$$\sin\theta_{omax} = n_1 \left[ 2 \left( 1 - \frac{n_2}{n_1} \right) \right]^{\frac{1}{2}} \quad (11)$$

For a $CS_2$ filled pyrex HFA, $\theta_{o\ max}=43°$. This corresponds to a focusing lens having an f-number of 0.53. Thus, the HFA is compatible with almost any focusing lens.

The length and diameter of the fiber, for a given non-linear optics substance, in all the above described embodiments depends on $E_{threshold}$. The length generally ranges from several centimeters to several meters and the diameter from several microns to several hundred microns.

We claim:

1. A non-linear optics device (NLOD) of the kind in which an incoming pumping beam of an intensity below the critical beam intensity is transmitted through the device and a beam having an intensity above the critical beam intensity, induces a Stimulated Brillouin Scatter (SBS) process whereby the beam is reflected back in an opposite direction, said device comprising one or more optical fibers having each a cladding and a core consisting of a non-linear optical substance and having a uniform section and a tapered section integrally linked to each other at a merger zone, the uniform core section having a first core diameter being the same throughout an entire length thereof and the tapered core section having a core with diverging walls such that a first end thereof extending from the merger zone, is of a diameter essentially equal to that of the first core diameter and a second end thereof is of a substantially larger diameter; the optical fiber being orientated so that the tapered section faces the incoming pumping beam; whereby a pumping beam incident on inner walls of said tapered section at an angle below the critical transmission angle of the optical fiber is directed into the uniform core section thereof.

2. An NLOD according to claim 1, comprising a lens in front of said radiation receiving end for converging the light into said tapered section.

3. A non-linear optics device (NLOD) of the kind in which an incoming pumping beam of an intensity below a critical beam intensity is transmitted through the device and a beam having an intensity above the critical beam intensity, induces a Stimulated Brillouin Scatter (SBS) process whereby the beam is reflected back in an opposite direction, said device comprising an array of optical fibers having each a cladding and a core consisting of a non-linear optical substance, with the fibers being orientated towards the incoming pumping beam.

4. An NLOD according to claim 3, comprising optical fibers having a uniform core diameter throughout.

5. A non-linear optics device (NLOD) of the kind in which an incoming pumping beam of an intensity below a critical beam intensity is transmitted through the device and a beam having an intensity above the critical beam intensity, induces a Stimulated Brillouin Scatter (SBS) process whereby the beam is reflected back in an opposite direction, Said device comprising an array of optical fibers having each a cladding and a core consisting of a non-linear optical substance and having a uniform section and a tapered section integrally linked to each other at a merger zone, the uniform core section having a first core diameter being the same throughout an entire length thereof and the tapered core section having a core with diverging walls such that a first end thereof, extending from the merger zone, is of a diameter essentially equal to that of the first core diameter and a second end thereof is of a substantially larger diameter; the optical fiber being orientated so that the tapered section faces the incoming pumping beam.

6. An NLOD according to claim 4, comprising a lens in front of said radiation receiving ends.

7. An NLOD according to claim 5, comprising a lens in front of said radiation receiving ends.

8. An NLOD according to claim 1, being a phase conjugate mirror.

9. An NLOD according to claim 3, being a phase conjugate mirror.

10. An NLOD according to claim 1, being a Brillouin Amplifier wherein the cores of the optical fibers have two oppositely tapering sections, one adapted to receive a pumping beam and the other adapted to receive a signal beam.

11. An NLOD according to claim 3, being a Brillouin Amplifier wherein the cores of the optical fibers have two oppositely tapering sections, one adapted to receive a pumping beam and the other adapted to receive a signal beam.

* * * * *